(No Model.) 2 Sheets—Sheet 1.

S. H. SAYRE, Jr.
WINDLASS WATER ELEVATOR.

No. 467,837. Patented Jan. 26, 1892.

Witnesses
Albert Speiden.
Lillie May Hillyard

Inventor
Samuel H. Sayre, Jr.
By his Attorneys
R. S. & A. P. Lacey

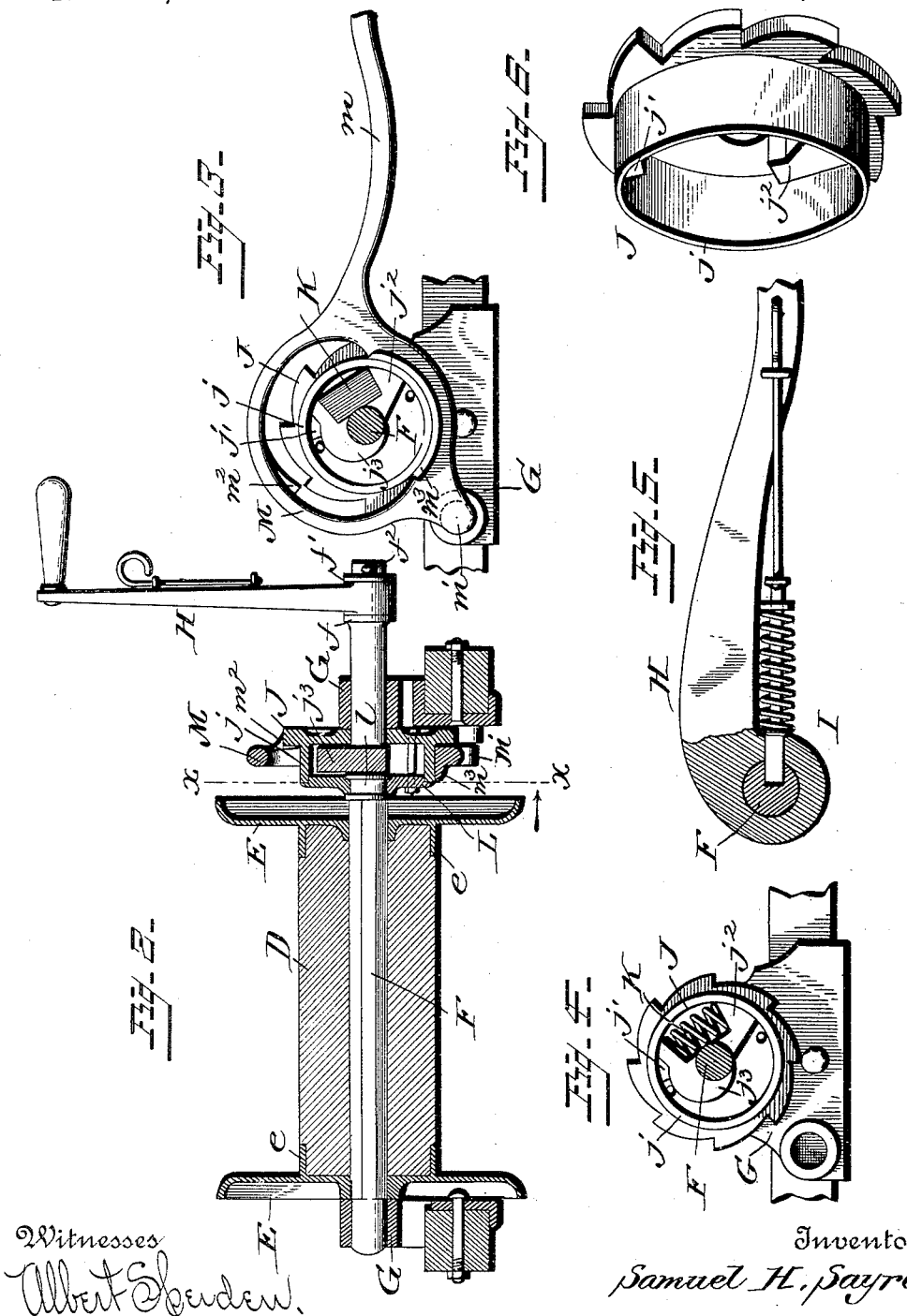

UNITED STATES PATENT OFFICE.

SAMUEL HUNTTING SAYRE, JR., OF HAMPTON, VIRGINIA.

WINDLASS WATER-ELEVATOR.

SPECIFICATION forming part of Letters Patent No. 467,837, dated January 26, 1892.

Application filed September 24, 1891. Serial No. 406,704. (No model.)

*To all whom it may concern:*

Be it known that I, SAMUEL HUNTTING SAYRE, Jr., a citizen of the United States, residing at Hampton, in the county of Elizabeth City and State of Virginia, have invented certain new and useful Improvements in Windlass Water-Elevators; and I do hereby declare the following to be a full, clear, and exact description of the invention, such as will enable others skilled in the art to which it appertains to make and use the same.

This invention relates to windlass water-elevators, and has for its object to prevent shock and breakage of the bucket-hoisting apparatus in the event of the bucket being suddenly stopped in its descent into the well.

A further purpose of the invention is to provide a combined brake and dog which is operated by a single handle to simultaneously apply the brake and release the dog to control the speed of the descending bucket, or disengage the brake and apply the dog when it is required to hold the windlass from backward rotation.

The improvement consists of the novel features and the peculiar construction and combination of the parts, which will be hereinafter more fully described and claimed, and which are shown in the annexed drawings, in which—

Figure 1:
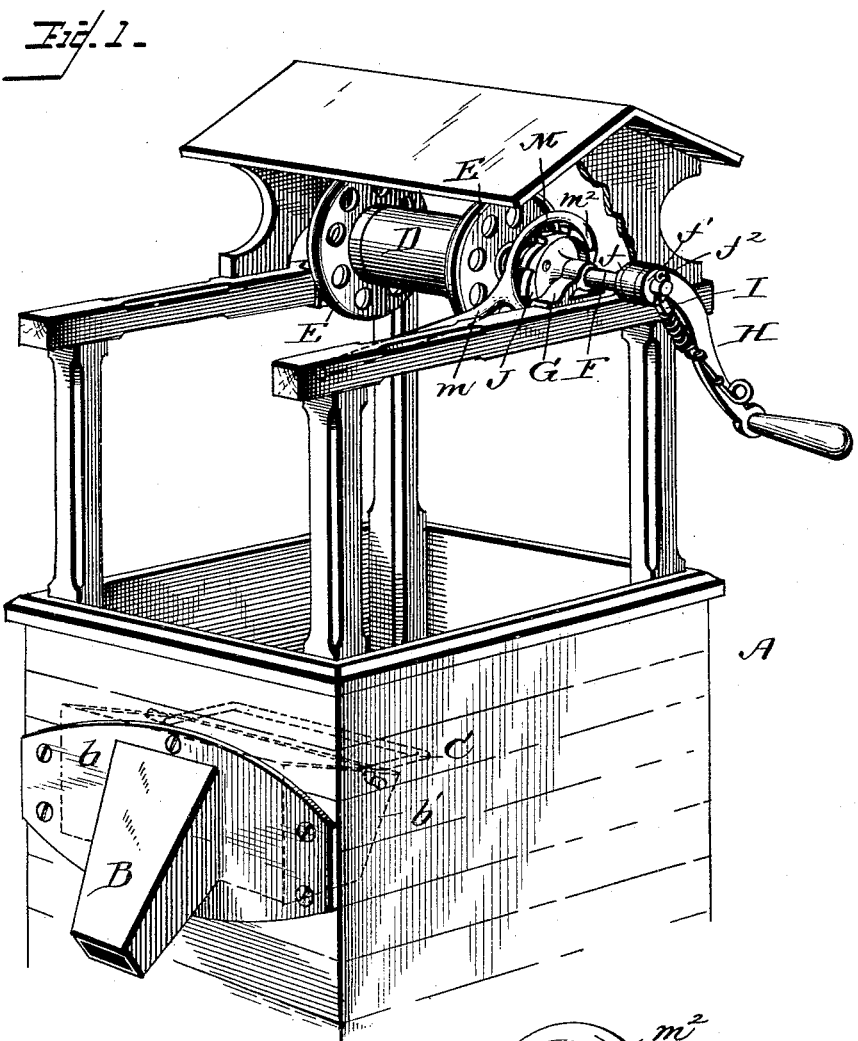
Figure 7:
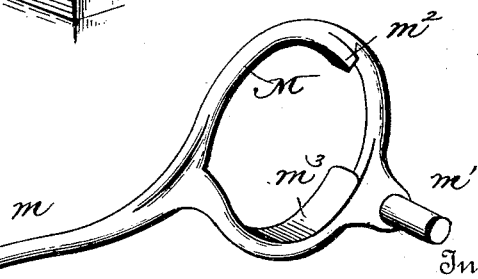

Figure 1 is a perspective view of a curb, showing the application of my invention thereto. Fig. 2 is a central longitudinal section of the windlass, showing the relative arrangement of the windlass-controlling appliances. Fig. 3 is a section on the line $x\,x$ of Fig. 2, looking in the direction of the arrow, the cap-plate being removed. Fig. 4 is a view similar to Fig. 3, the combined brake and dog being removed, showing the rubber block replaced by a coil-spring. Fig. 5 is a detail view of the crank end of the shaft or axle of the windlass. Fig. 6 is a detail view of the ratchet-wheel. Fig. 7 is a detail view of the combined brake and dog.

The well-curb A is of usual construction and adaptation to support the operating parts. The spout B is provided with a base portion $b$, which is secured to the outside of the curb, and with a trough portion $b'$, which projects within the curb and receives the water which is discharged from the buckets. The bail C, for tripping the buckets, is attached to the trough $b'$. The windlass is composed of a wooden center or drum D, end disks E, having flanges $e$, which receive the ends of the center or drum, and a shaft or axle F, which is driven through a bore in the center of the said drum or wooden center D, the shaft being angular, to prevent it from turning in the said drum and metal disks E, the latter having corresponding angular openings to receive the said shaft. This shaft is mounted in bearings G, which are secured on cross-bars of the curb, and is provided at one end with the crank H, which is held thereon between an annular shoulder $f$ and a washer $f'$, the latter being retained on the shaft by the pin $f^2$. The spring-actuated latch-bolt I, mounted on the crank, is constructed to lock the crank on the shaft, and is adapted to be released from the said shaft when the bucket is descending. The ratchet-wheel J is provided on its inner side with a rim $j$ and with lugs $j'\,j^2$. The shaft or axle is provided at its crank end with an arm $j^3$, which is adapted to engage with the lug $j'$ and cause the ratchet-wheel and shaft to revolve together. A yielding connection is interposed between the lug $j^2$ and the arm $j^3$ to take up shock and prevent a breakage of the hoisting appliances in the event of the bucket being suddenly stopped in its rapid descent. This yielding connection may be a rubber block K, as shown in Fig. 3, or it may be a coil-spring K', as shown in Fig. 4. The cap-plate L, for closing the inner end of the rim or band $j$, is seated in an annular groove $l$, provided on the shaft F, by means of which it is held from longitudinal movement on the said shaft, and for convenience is constructed of two halves, whereby it can readily be adjusted to or removed from the said shaft. This cap snugly fits within the rim or band $j$ and is provided with a flange which overlaps and bears against the end of the said rim or band $j$. This cap is bolted to the ratchet-wheel and incloses the parts $j'$, $j^2$, $j^3$, and K, and obtains a bearing on the said shaft F.

The combined brake and dog is composed of a ring M, which is provided with a handle $m$ and a pivoted extension $m'$, which obtains a bearing in the bearing-block G, and with a lug $m^2$ to engage with the teeth of the ratchet-wheel J, and a lateral extension $m^3$, which is adapted to engage with the rim or band $j$ and forms the brake mechanism.

The operation of the invention is obvious to one skilled in the art from the foregoing description. However, it may be well to state that the arm $j^3$ and the lug $j'$ engage and form a lock while elevating the bucket; but in the event of the sudden stoppage of the bucket when descending rapidly the shock occasioned thereby will be compensated by the yielding connection K.

Having thus described my invention, what I claim, and desire to secure by Letters Patent, is—

1. In a windlass water-elevator, the combination, with the drum and an arm projected from the axle or shaft, of a ratchet-wheel loosely mounted on the said shaft and having a lug, and a yielding connection interposed between the said arm and lug to compensate for shock, substantially in the manner set forth.

2. In a windlass water-elevator, the combination, with the drum and an arm projected from the shaft or axle thereof and a ratchet-wheel having an inner rim or band provided with a lug and loosely mounted on the said shaft, of a yielding connection located within the said rim or band and held between the said arm and lug, substantially as and for the purpose described.

3. In a windlass water-elevator, the combination, with the drum, the shaft having an arm and an annular groove, and a ratchet-wheel mounted on the said shaft and having an inner band or rim and a lug, of a yielding connection interposed between the said arm and lug and located within the said rim or band, and a cap-plate closing the inner end of the said rim and seated in the said groove and held to the ratchet-wheel, substantially as and for the purpose set forth.

4. In a windlass water-elevator, the combination, with the drum, the shaft having an arm and an annular groove, and a ratchet-wheel mounted on the said shaft and having an inner band or rim and a lug, of a yielding connection interposed between the said arm and lug and located within the said rim or band, and a cap-plate closing the inner end of the said rim and made in parts which are secured to the ratchet-wheel and are seated in the said groove, substantially as described.

5. In a windlass water-elevator, the combination, with the drum having an arm projected from the shaft thereof and a ratchet-wheel mounted on the shaft and having an inner rim or band and having a lug, of a yielding connection between the said arm and lug, a combined brake and dog constructed to engage with the said ratchet-wheel and rim thereof, a crank on the shaft, and a spring-actuated latch to lock the said crank on the shaft, substantially as set forth.

6. In a windlass water-elevator, the combination, with the drum, the shaft having an arm and an annular groove, a ratchet-wheel having an inner rim or band and having a lug, a yielding connection between the arm and the lug, and a cap-plate seated in the said groove and secured to the said ratchet-wheel, of a combined brake and dog composed of a ring having a pivotal support and a handle and having a lug to engage with the ratchet-wheel teeth, and a lateral extension forming a brake-shoe, substantially as described.

In testimony whereof I affix my signature in presence of two witnesses.

SAMUEL HUNTTING SAYRE, JR.

Witnesses:
NELSON S. GROOME,
WM. P. BAINBRIDGE.